United States Patent [19]

Tilling

[11] 4,266,574
[45] May 12, 1981

[54] VENT VALVE

[75] Inventor: Basil B. Tilling, Mission Viejo, Calif.

[73] Assignee: Parker-Hannifin Corporation, Cleveland, Ohio

[21] Appl. No.: 31,666

[22] Filed: Apr. 19, 1979

[51] Int. Cl.³ .............................................. F16K 31/12
[52] U.S. Cl. .............................. 137/630.19; 137/522; 137/541; 137/587; 137/628; 141/302; 251/63.5
[58] Field of Search ........... 137/541, 587, 628, 630.19; 141/51, 302; 251/63.5

[56] References Cited

U.S. PATENT DOCUMENTS

| | | | |
|---|---|---|---|
| 507,901 | 10/1893 | Grist | 137/541 X |
| 2,409,071 | 10/1946 | Scott | 137/630.19 X |
| 2,608,210 | 8/1952 | StClair | 137/541 |
| 3,115,894 | 12/1963 | Marx | 137/587 X |
| 3,125,320 | 3/1964 | DeFrees | 251/63.5 |
| 3,144,056 | 8/1964 | Mosher | 137/587 X |
| 3,251,375 | 5/1966 | Reed | 137/628 X |
| 3,486,528 | 12/1969 | DeFrees | 137/587 |
| 3,770,011 | 11/1973 | Muehl | 137/587 |
| 3,771,549 | 11/1973 | Lemon | 137/393 |
| 3,981,325 | 9/1976 | Robinson | 137/587 |

OTHER PUBLICATIONS

Parker-Hannifin Drawing No. AIP F646; May 1974.

Primary Examiner—Robert G. Nilson
Attorney, Agent, or Firm—James A. Baker

[57] ABSTRACT

A system for filling and emptying a fluid storage tank includes an air pressure source 11, a vent valve 12, and a fill valve 14. The vent valve 12 includes first and second housing portions 23 and 24 and a main valve member 18. A coil spring 20 acts between the second housing portion 24 and a valve stem 19 to close the main valve member 18 and to bias the housing portions 23 and 24 together. A piston 21 cooperates with the second housing portion 24 to define an expansible chamber 39, and air pressure from the source 11 enters the chamber 39 to move the piston 21 and open the main valve member 18. A secondary valve member 40 isolates the fill valve 14 from the air pressure source 11 until the main valve member 18 is opened, and then communicates air pressure to the fill valve 14 to open the fill valve 14 and permit filling or emptying the tank.

9 Claims, 3 Drawing Figures

VENT VALVE

BACKGROUND OF THE INVENTION

This invention relates generally to valves, and more particularly to a vent for use in a system for filling and emptying fluid storage tanks.

Fluid storage tanks, such as fuel tanks, may be provided with a vent valve which opens to vent the top of the tank to atmosphere when the tank is being filled or emptied, and a fill valve through which the fluid passes during such filling or emptying. The vent valve can be arranged so that it is opened by a mechanical actuator or by air pressure or by internal pressure in the tank. Examples of prior art fuel tank vent valves are shown in U.S. Pat. Nos. 3,144,056, 3,770,011, 3,771,549, and 3,981,325.

SUMMARY OF THE INVENTION

The present invention departs from these and other prior art valves and provides a valve which includes a housing having first and second separable housing portions. An annular valve seat is arranged on the first housing portion, and a main valve member is arranged so that it is movable toward and away from the valve seat for opening and closing the valve. A stem which carries the main valve member extends into the second housing portion, and a spring device acts between the second housing portion and the stem to provide the dual functions of pressing the first and second housing portions toward one another and resiliently biasing the main valve member against the valve seat. By this arrangement, the separable housing portions do not have to be connected with large connecting devices such as threaded fasteners, and instead only small locating pins need be used to retain the separable housing members together.

An annular piston is disposed concentrically on the stem, and the piston and housing cooperatively define an air chamber. The second housing portion includes an inlet port and an outlet port, and pressurization of the air chamber through the inlet port moves the piston in a direction to move the stem and main valve member in a direction to open the valve. A secondary valve member is carried by the piston, and the secondary valve member closes the outlet port so that the outlet port remains closed until the piston has moved a sufficient distance to open the main valve member. After this initial movement, the outlet port is opened, and air pressure from the inlet port is directed through the outlet port to the fill valve to begin the desired filling or emptying of the fuel tank.

BRIEF DESCRIPTION OF THE DRAWINGS

These and other features and advantages of the invention are incorporated in the preferred embodiment of the invention shown in the accompanying drawings, wherein.

DETAILED DESCRIPTION OF THE DRAWINGS

Figure 1:
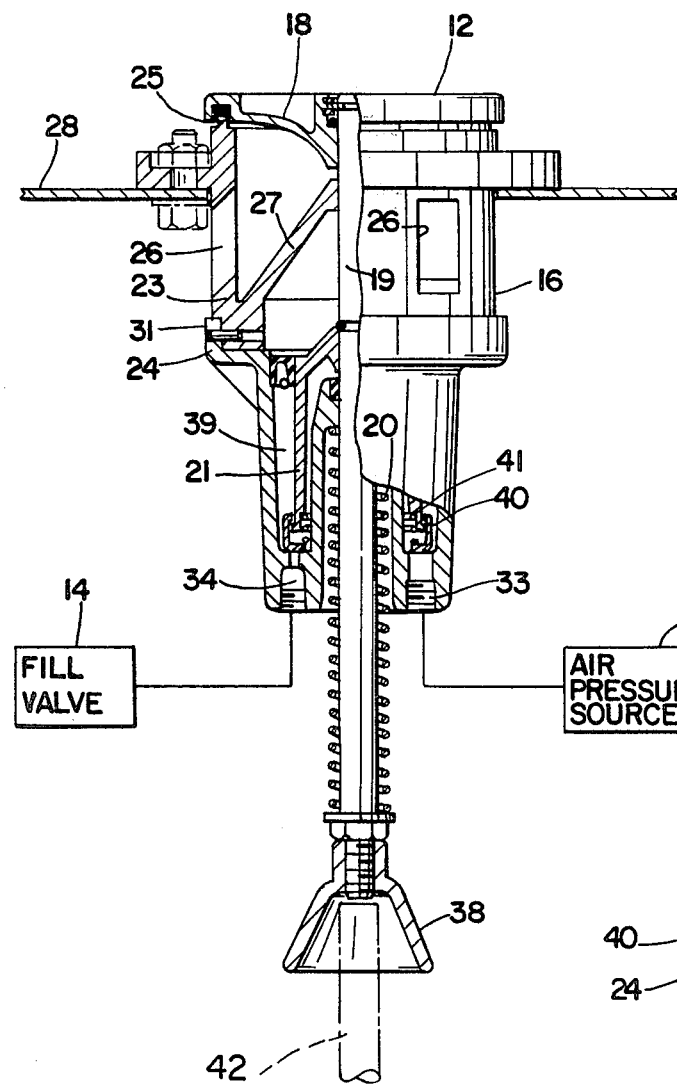
FIG. 1 is a side elevational view, partially in cross section, of a valve according to the principals of the invention as used in a system for filling and emptying a tank.

Referring now to the drawings in greater detail, FIG. 1 shows a system for filling and emptying a fluid storage tank. The system includes an air pressure source 11, a vent valve 12, and a fill valve 14. In the preferred embodiment, this system is utilized on a fuel tank truck, and the air pressure source 11 is a compressor or an accumulator on the tank truck. The system is arranged so that it first opens the vent valve 12 and then opens the fill valve 14 when the tank is to be filled or emptied.

The vent valve 12 includes a housing 16, a main valve member 18, a stem 19, a coil spring 20, and a piston 21. The piston 21 is preferably of a suitable plastic material, and the remaining components are of a suitable iron or steel.

The housing 16 includes a first cylindrical housing portion 23 and a second cylindrical housing portion 24. The first housing portion 23 includes an annular valve seat 25, a plurality of openings 26, and a conical stem guide 27. The first housing portion 23 is bolted to a wall 28 of the tank in which the system is used. The second housing portion 24 includes an annular skirt 31 which surrounds and incapsulates a part of the first housing portion 23 to prevent relative movement therebetween. Three locating pins 32, only one of which is shown in FIG. 1, retain the first and second housing portions 23 and 24 together to prevent separation when remaining portions of the vent valve 12 are disassembled. The second housing portion 24 also includes an air inlet port 33 and an air outlet port 34, as described further below.

Figure 2:
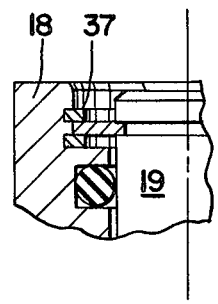
FIG. 2 is an enlarged view of a portion of the valve shown in FIG. 1.

The valve member 18 is mounted for axial movement relative to the housing 16 between a closed position shown in FIG. 1 and an open position (not shown) permitting passage of fluid through the opening 26 and past the valve seat 25. As best shown in FIG. 2, the valve member 18 is carried by the stem 19. A snap ring 37 secures the valve member 18 on the stem 19, but removal of the snap ring 37 permits the valve stem 19 to move without opening the valve member 18. By this arrangement, in the event the fuel tank is on its side so that it is desired to open the fill valve 14 without opening the vent valve 12, the snap ring 37 can be removed. Then, when air is supplied from the air pressure source 11 through the ports 33 and 34 to the fill valve 14, the upward movement of the valve stem 19 will not open the valve member 18. When this is done, external clamps (not shown) must be secured to the valve member 18 before removing the snap ring 37 so that the valve member 18 is retained against the valve seat 25.

The stem 19 is an elongated rod which carries an inverted cup shaped guide 38 at its lower end. The guide 38 assures that a mechanical actuator 42 (shown in phantom in FIG. 1) will be aligned with the stem 19 to move the stem 19 upwardly when the actuator 42 is moved upwardly. The actuator 42 may be used in place of air pressure from the source 11 to open the vent valve 12 when the positions of the vent valve 12 and fill valve 14 on the tank permit mechanical actuation, in a well known manner. The lower end of the stem 19 also carries a locking bolt and washer which lock the guide 42 in place and which provide a bottom stop for the coil spring 20.

The spring 20 acts between the washer and bolt at the lower end of the stem 19 and the second housing portion 24. By this arrangement, the spring 20 serves the dual function of biasing the valve member 18 to a closed position against the valve seat 25 and biasing the housing portions 23 and 24 toward one another. This eliminates the necessity of heavy load bearing connector devices for securing the housing portions 23 and 24 together. Instead, the small locating pins 32 are used to retain the housing portions 23 and 24 together when remaining portions of the vent valve 12 are disassembled.

Figure 3:
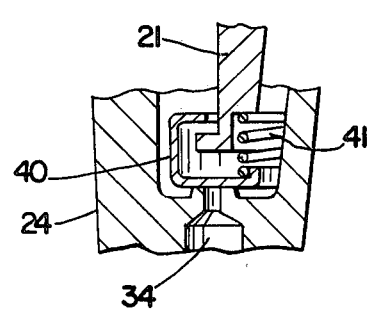
FIG. 3 is an enlarged view of another portion of the valve shown in FIG. 1.

The plastic piston 21 is carried on the stem 19, and the top surface of the piston 21 engages a retaining ring carried on the stem 19 so that upward movement of the piston 21 causes upward movement of the stem 19 and valve member 18. As best shown in FIG. 3, the lower end of the piston 21 carries an annular secondary valve member 40. A light biasing spring 41 urges the secondary valve member 40 downwardly to close the outlet port 34 when the piston 21 is in the position shown in FIG. 1. The inlet port 33, however, is arranged so that it is not blocked by the valve member 40 under any conditions. The piston 21 sealingly engages the stem 19, and the piston 21 and second housing portion 24 cooperatively define a sealed expansible chamber 39.

When the vent valve 12 and fill valve 14 are to be opened, air from the air pressure source 11 is supplied to the inlet port 33. This air pressure is not communicated to the fill valve 14, however, because the secondary valve member 40 blocks the outlet port 34. When the air pressure in the chamber 39 is sufficient to overcome the preload of the spring 20, the piston 21 and stem 19 and main valve member 18 begin to move upwardly. After the valve member 18 has moved away from the valve seat 25 so that the vent valve 12 is opened, the lip at the bottom of the piston 21 picks up the valve member 40 to open the outlet port 34. The air pressure is then communicated to the fill valve 14 to permit filling or emptying the tank.

When mechanical actuation of the vent valve 12 is used in place of pneumatic actuation, the actuator 42 is raised vertically upwardly and is guided by the guide 38 so that is engages the bottom of the stem 19. Continued upward movement of the actuator 42 then causes the main valve member 18 to open.

What is claimed is:

1. A valve assembly comprising a housing having first and second separable housing portions, an annular valve seat disposed on said first housing portion, a valve member movable toward and away from said valve seat, a stem carrying said valve member, spring means carried by said stem, said spring means acting between said second housing portion and said stem and resiliently biasing said second housing portion toward said first housing portion and resiliently biasing said valve member against said valve seat, a piston disposed on said stem, said piston including an end wall and a generally cylindrical wall extending axially from said end wall and terminating at a free end, said second housing portion including generally concentric radially inner and radially outer generally cylindrical walls, said cylindrical wall of said piston and said cylindrical walls of said second housing portion cooperatively defining an expansible chamber, said cylindrical wall of said piston being telescopically received between said cylindrical walls of said second housing portion, and a substantial portion of the axial extent of said spring means being disposed within said inner cylindrical wall of said second housing portion.

2. A valve assembly according to claim 1 wherein said stem extends into said second housing portion, and said spring means is a coil spring carried on said stem.

3. A valve assembly according to claim 1, said housing including an inlet port and an outlet port in fluid communication with said air chamber, and at least one of said ports being disposed on said second housing portion at the juncture of said concentric cylindrical walls.

4. A valve assembly according to claim 3 including a valve member operably connected to said cylindrical wall of said piston adjacent said free end for closing said one port when said piston is in one position relative to said housing.

5. A valve assembly according to claim 4 wherein said one port is said outlet port.

6. A valve assembly according to claim 5 including means releasably connecting said stem and said valve member.

7. A valve assembly comprising a housing, an annular valve seat on said housing, a valve member movable toward and away from said valve seat, a stem carrying said valve member, an annular piston concentrically disposed on said stem, said piston and said housing cooperatively defining an expansible chamber, said expansible chamber having a minimum volume configuration and a maximum volume configuration, said piston including an end wall and a generally cylindrical wall extending axially from said end wall and terminating at a free end, said housing including generally concentric radially inner and radially outer generally cylindrical walls, said cylindrical wall of said piston and said cylindrical walls of said housing cooperatively defining said expansible chamber, said cylindrical wall of said piston being telescopically received between said cylindrical walls of said housing, a spring acting between said stem and said housing and urging said valve member toward said valve seat, said spring being a coil spring disposed on said stem with a substantial portion of the axial length of said spring being disposed within said inner cylindrical wall of said housing, a port in said housing communicating with said chamber, said port being disposed at the juncture of said inner and outer cylindrical walls of said housing, valve means carried by said piston closing said port when said expansible chamber is in said minimum volume configuration, said valve means including a valve member, and lost motion connection means operably connecting said valve member to said free end of said cylindrical wall of said piston and moving said valve member axially only when said free end is moved at least a predetermined distance from said minimum volume position.

8. A valve assembly according to claim 7 wherein said valve means is resiliently biased toward said port.

9. A valve assembly according to claim 7 including spring means acting between said piston and said valve member urging said valve member in a direction to close said port.

* * * * *